J. POWELL.
Globe-Valve.

No. 8,368. Reissued Aug. 13, 1878.

Attest.
L. A. Bond
D. P. Kennedy.

Inventor.
James Powell
by James H. Layman
his Attorney.

N. PETERS, PHOTO-LITHOGRAPHER, WASHINGTON, D. C.

UNITED STATES PATENT OFFICE.

JAMES POWELL, OF CINCINNATI, OHIO.

IMPROVEMENT IN GLOBE-VALVES.

Specification forming part of Letters Patent No. 77,913, dated May 12, 1868; Reissue No. 6,529, dated July 6, 1875; Reissue No. 8,368, dated August 13, 1878; application filed August 9, 1877.

*To all whom it may concern:*

Be it known that I, JAMES POWELL, of Cincinnati, Hamilton county, Ohio, have invented certain new and useful Improvements in Globe-Valves, of which the following is a specification:

My invention is an improvement on those cocks commonly called "globe-valves," in which provision is made for regrinding the disk or valve proper to its seat by the instrumentality of its proper stem and handle.

My invention consists, chiefly, in an arrangement of a loose guide-collar and its accessories for the convenient and accurate grinding and regrinding of the valve.

My invention further consists in an arrangement of secondary or auxiliary seats on the guide-piece and cap, which enables the repacking of the stuffing-box at any time, even while a full pressure of steam remains in the cock.

My invention consists, also, in a peculiar arrangement and construction of the valve-disk and locking device for regrinding.

Figure 1:
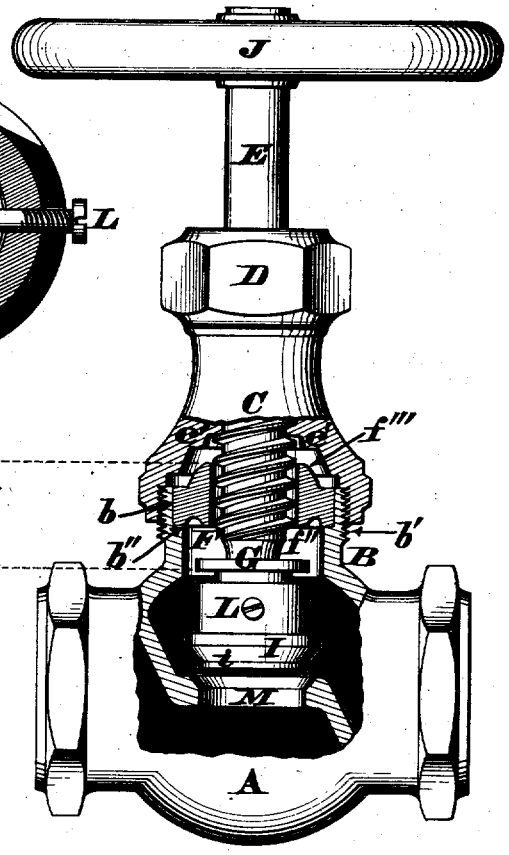
Figure 6:
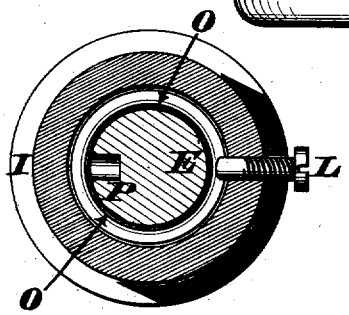
Figure 4:
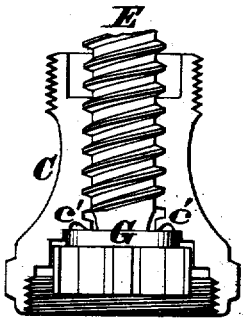
Figure 4:
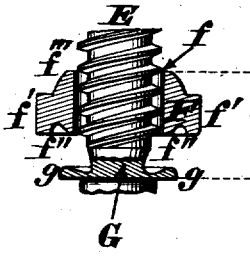
Figure 3:
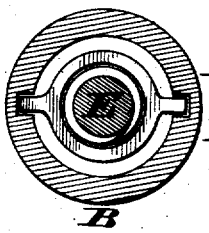
Figure 5:
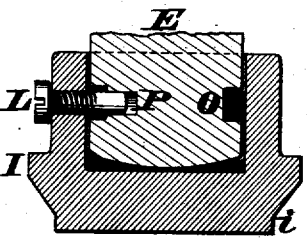
Figure 2:
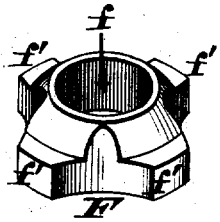

In the accompanying drawing, Figure 1 is a partially-sectionized side elevation of a globe-valve embodying my invention. Fig. 2 is a perspective view of the loose guide-collar. Fig. 3 is a transverse section of a modified form of said collar. Fig. 4 is an axial section, showing the manner of facing the collar against the cap preparatory to repacking the stuffing-box. Fig. 5 is an axial section, showing the method of locking the valve to its stem for grinding; and Fig. 6 is a horizontal section, showing the valve unlocked from its stem.

In the original and improved form of globe-valves patented to me May 2, 1865, the valve-stem is provided with fixed wings or guides for retaining said stem in an axial position with respect to the seat while being reground; but in my patent of February 5, 1867, a modified form of the wings is shown as rotatable with reference to the valve-stem. Said wings, however, are compelled to move vertically with the stem, except when the valve is to be ground, at which time said wings are temporarily locked to said stem.

In my present improvement, in its preferred form, the guide-wings consist of projections from a loose or movable collar that surrounds the threaded part of the valve-stem, thus enabling cocks embracing my principle to be made in the ordinary manner without fixed guides on the stem, and yet have the advantage of the application of guiding facilities to said stem, and for the purpose of grinding the valve proper to its seat in the valve-body.

Globe-valves having loose disks, as heretofore constructed, have had no provision for packing the stem under full pressure of steam; hence before such valve could be repacked the steam had invariably to be shut off, involving great inconvenience and delay, whereas globe-valves made on my present improved plan may be readily repacked at any moment, whether the valve be in its closed or in its extreme open position.

The body A of the improved globe valve or cock has a neck, B, having a smooth cylindrical interior, *b*, of larger diameter than the contiguous interior of the globe-chamber, so as to present a ledge or shoulder, *b''*, for support in its lowest position of the guide-collar, hereinafter described; and said neck has a screw-threaded exterior, *b'*, which exterior receives the interiorly screw-threaded hub, cap, or chamber C, said hub being surmounted by a customary stuffing-box, D, as described in my patent of May 2, 1865.

The valve-stem E is threaded in the ordinary manner as far down as the fixed collar G.

In addition to the above, I provide a loose guide piece or collar, F, whose cylindrical orifice *f* is adapted to slide or revolve freely over the threaded portion of the valve-stem E, while at the same time the periphery of the wings *f'*, which radiate from said collar, is adapted to fit and slide snugly within the cylindrical interior *b* of the neck B, as in my patent of February 5, 1867.

In my preferred form of the above the fixed collar G is surmounted by a raised rim or seat, *g*, which, in the elevated condition of the valve, fits and occupies an annular depression or gutter, *f''*, on the under side of the loose collar F, and the said loose collar is itself surmounted with a raised rim or seat, *f'''*, which, when the valve is elevated, occupies an annular gutter, *c'*, in the under side of the hub or cap C.

The valve proper, I, has a prolongation or cylindrical extension, *i*, which fits snugly within the straight walls of the valve-seat opening M while the valve is seated or while said valve is being ground. This extension also serves to deflect the force of the currents of passing fluids, and thus prevents wear of the parts in the act of opening and closing the valve, as in my patent of February 5, 1867.

The valve I is chambered out on top to receive the lower swell of the screw-stem, and is provided with a screw, L, which, when the valve is in its normal condition, works in a circumferential groove, O, near the lower end of stem E, so as to retain the valve in place without affecting its capacity for independent oscillation and rotation. (See Fig. 6.)

This combination of valve-disk and lock-pin differs from that described in my patent of February 5, 1867, in the fact that the lock-pin passes through the body of the disk proper instead of through the nut or hub described in said patent.

It is also obvious that my improvement will apply to a check-valve as well as to the ordinary globe-valve.

A countersink, P, is provided to receive the inner end of pin L when the valve is locked for the purpose of grinding. (See Fig. 5.)

When it is desired to grind the valve to its seat the cap C is temporarily unscrewed, and, the valve and stem being withdrawn, the screw L is turned down into the countersink, P, as in my patent of February 5, 1867, so as, without impairing the free oscillation of the valve, to oblige it to revolve in company with the stem in the operation of grinding. A suitable abradent being applied, the loose collar is adjusted to its place in the neck B, and thus becomes a guide, through which the stem revolves, and by which it is retained in a truly axial position while the valve is being ground. The grinding having been effected, the pin L is to be loosened sufficiently to allow the valve to revolve upon the stem.

Should it be desired to repack the stem while the valve is in use, or while a full head of steam is flowing through the cock, the operator has merely to screw the stem back to its fullest extent until the fixed collar G is forced up against the loose collar F and the latter against the cap C, so as to secure a perfectly-tight joint, which having been done, the gland D may be removed to receive the packing in the usual way.

I do not propose to confine myself to the precise arrangement herein described, as various modifications of my improvement may be made. For example, the loose collar may, instead of the winged piece F, consist of a circular ring or plate, or may be a simple cross-bar dropped into vertical grooves in the neck of the globe, as in Fig. 3; or the fixed collar G may bear at once in the depression of the cap in the elevated position of the stem. (See Fig. 4.)

I claim as my invention—

1. The loose collar or guiding-plate F, supported by the globe-valve neck B, said plate or collar F being traversed by valve-stem E without engaging with the screw of the latter, substantially as and for the purpose described.

2. The packing-collar G, cast with valve-stem E, in combination with the loose disk-valve and the hub C, as described and set forth.

3. The valve I and valve-stem E, in combination with the supported and unthreaded guide-plate F, for the purpose described.

4. The described loose disk-valve I, with the screw L passing through the body of said valve, in combination with the screw-stem E, as and for the purpose set forth.

5. The described loose disk-valve I, screw L, stem E, fast collar G, and loose collar F, combined and arranged as set forth.

6. The valve I, loose unthreaded guide-plate F, body-neck $b'$ $b''$, screw-stem E, and handle J, combined and arranged substantially as described.

7. The described loose disk-valve I, perforated for the reception of a retaining device, whose inner end enters a countersink or cavity in the valve-stem E when said valve is to be ground, substantially as herein described.

8. The described perforated loose disk-valve I, guide-extension $i$, and seat-opening M, in combination with a valve-stem, E, which stem is constructed to receive a retaining device for the purpose of locking said valve I while the latter is being ground, substantially as herein explained.

In testimony of which invention I hereunto set my hand.

JAMES POWELL.

Witnesses:

JAMES H. LAYMAN,

L. H. BOND.